(12) United States Patent
Issa

(10) Patent No.: US 7,849,163 B1
(45) Date of Patent: Dec. 7, 2010

(54) SYSTEM AND METHOD FOR CHUNKED FILE PROXY TRANSFERS

(75) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1518 days.

(21) Appl. No.: 11/201,593

(22) Filed: Aug. 11, 2005

(51) Int. Cl.
*G06F 15/16* (2006.01)

(52) U.S. Cl. .................. 709/219; 709/205; 709/217

(58) Field of Classification Search ............... 709/205, 709/217, 219; 707/101
See application file for complete search history.

(56) References Cited

U.S. PATENT DOCUMENTS

| | | | | |
|---|---|---|---|---|
| 5,768,528 | A | 6/1998 | Stumm .................. | 395/200.61 |
| 6,240,461 | B1 | 5/2001 | Cieslak et al. .............. | 709/235 |
| 6,463,508 | B1 * | 10/2002 | Wolf et al. .................. | 711/133 |
| 6,742,082 | B1 | 5/2004 | Lango et al. ................ | 711/118 |
| 6,754,795 | B2 | 6/2004 | Chen et al. .................. | 711/170 |
| 6,813,690 | B1 | 11/2004 | Lango et al. ................ | 711/118 |
| 7,039,784 | B1 | 5/2006 | Chen et al. | |
| 7,159,005 | B1 * | 1/2007 | Baber et al. ................. | 709/200 |
| 2003/0061287 | A1 * | 3/2003 | Yu et al. ..................... | 709/205 |
| 2004/0162885 | A1 * | 8/2004 | Garg et al. .................. | 709/213 |
| 2005/0066063 | A1 | 3/2005 | Grigorovitch et al. | |
| 2005/0071496 | A1 | 3/2005 | Singal et al. | |
| 2005/0097085 | A1 | 5/2005 | Shen et al. | |
| 2006/0059171 | A1 * | 3/2006 | Borthakur et al. ........... | 707/100 |
| 2006/0064716 | A1 | 3/2006 | Sull et al. | |

OTHER PUBLICATIONS

Sung-Ju Lee et al., "An Interactive Video Delivery and Caching System Using Video Summarization," Hewlett-Packard Laboratories, Palo Alto, California, Jun. 11, 2001, 9 pages.

* cited by examiner

*Primary Examiner*—Ario Etienne
*Assistant Examiner*—Avi Gold
(74) *Attorney, Agent, or Firm*—Withrow & Terranova, PLLC

(57) ABSTRACT

A system and method for transferring Very Large Files (VLFs) from a content provider to a requesting node over a network via a proxy are provided. The content provider processes a VLF to provide a chunked VLF. The chunked VLF includes a number of chunks each including a portion of the VLF. A transfer is initiated when a request for the VLF is sent from the requesting node to the proxy. The proxy then determines if any of the chunks of the chunked VLF are stored in proxy cache associated with the proxy. If not, the proxy directs the request to the content provider. In response, the content provider sends the chunks of the chunked VLF to the proxy. Upon receiving each of the chunks, the proxy stores the chunk in the proxy cache and sends the chunk to the requesting node.

16 Claims, 7 Drawing Sheets

US 7,849,163 B1

SYSTEM AND METHOD FOR CHUNKED FILE PROXY TRANSFERS

FIELD OF THE INVENTION

The present invention relates to a system and method for transferring files over a network, such as the Internet, and particularly relates to transferring a file over a network via a caching proxy.

BACKGROUND OF THE INVENTION

The increasing resolution of digital cameras and scanners and the popularity of digital videos have increased the size of associated files and the burden on communication networks used to transfer these files among users. To alleviate some of this burden, caching proxies are often used. In these systems, requests for a file are sent from a requesting node to a proxy rather than to the content provider. The proxy then requests the file from the content provider. As the proxy receives the file from the content provider, the proxy streams the file to the requesting node. Once the transfer is complete, the proxy may retain all or a portion of the file in cache. When a subsequent request for the file is received, the proxy serves the request from the proxy cache rather than requesting the file from the content provider.

One issue arises when only a portion of the file is stored in the proxy cache. In this case, when a subsequent request for the file is received, the proxy begins to serve the request from the proxy cache. However, in order to obtain the rest of the file, the proxy must request the entire file from the content provider. In other words, even though a portion of the file is stored in the proxy cache, the entire file must still be transferred from the content provider to the proxy, thereby wasting time and bandwidth.

Another issue with typical caching proxies is that interruptions of transfers often occur. These interruptions may be due to a user at a requesting node canceling the transfer or an interruption in a connection between the content provider and the caching proxy and/or the connection between the caching proxy and the requesting node. If an interruption occurs during transfer of the file from the content provider to the caching proxy, the portion of the file already received by the caching proxy is cleared from the proxy cache. As a result, when a subsequent request for the file is received by the caching proxy, the caching proxy must again request the entire file from the content provider. Thus, there remains a need for a system and method for improved proxy transfers.

SUMMARY OF THE INVENTION

The present invention provides a system and method for transferring Very Large Files (VLFs) from a content provider to a requesting node over a network via a proxy. The content provider, which may be a peer node in a peer-to-peer network, processes a VLF to provide a chunked VLF. The chunked VLF includes a number of chunks each including a portion of the VLF. A transfer is initiated when a request for the VLF is sent from the requesting node to the proxy. The proxy then determines if any of the chunks of the chunked VLF are stored in proxy cache associated with the proxy. If not, the proxy directs the request to the content provider. In response, the content provider sends the chunks of the chunked VLF to the proxy. Upon receiving each of the chunks, the proxy stores the chunk in the proxy cache and sends the chunk to the requesting node.

After the transfer is complete, the proxy retains all or a portion of the chunks in the proxy cache. If an interruption occurs during the transfer, the proxy retains all or a portion of the chunks transferred from the content provider to the proxy until the interruption occurred in the proxy cache. As a result, whether an interruption in the transfer does or does not occur, some of the chunks, if not all of the chunks, are stored in the proxy cache. When a subsequent request for the VLF is received, the proxy serves the chunks from the proxy cache to the requesting node and requests any needed chunks from the content provider.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
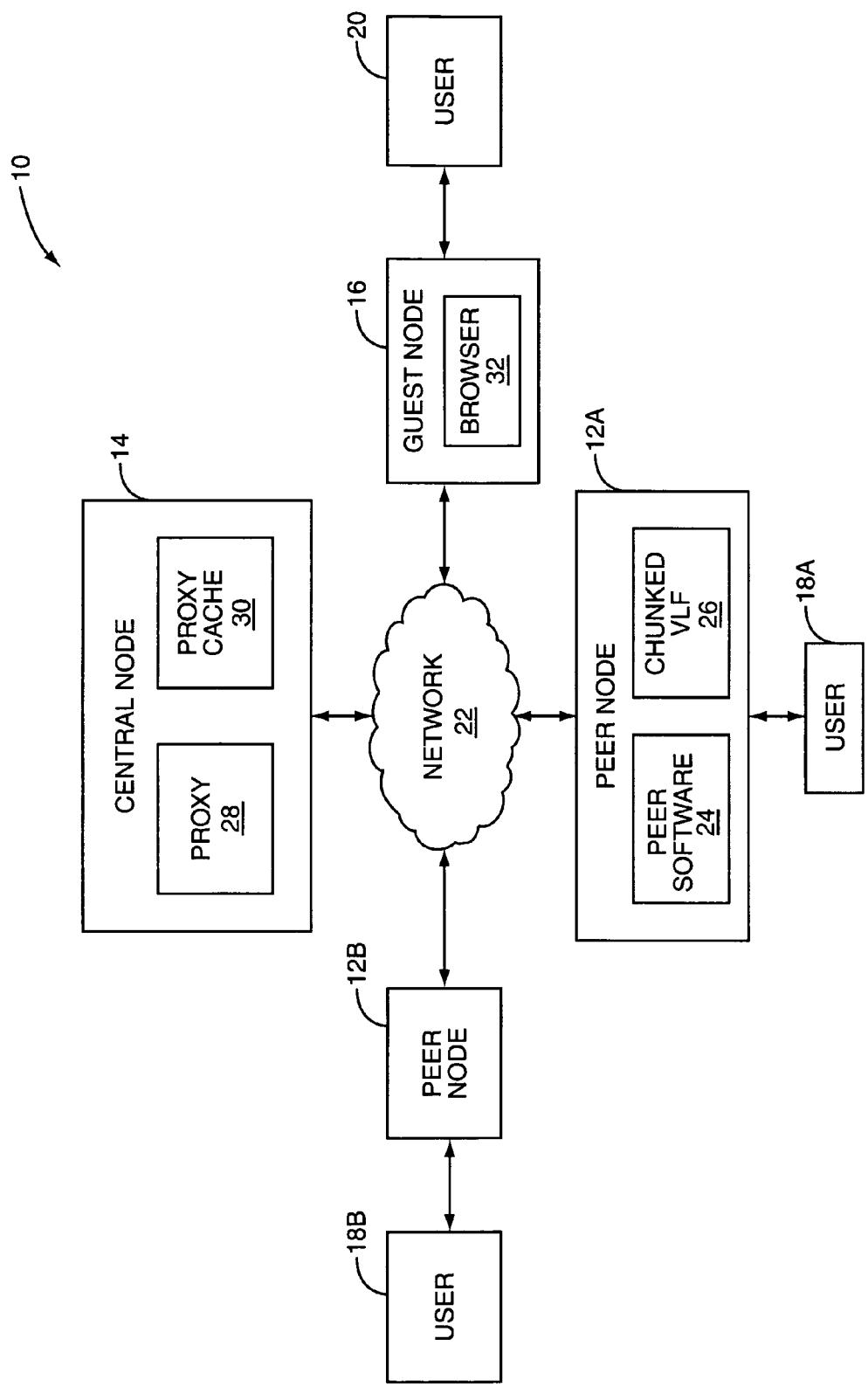
FIG. 1 is a basic block diagram of a system for transferring a chunked file from a content provider to a requesting node over a network via a proxy according to one embodiment of the present invention.

The present invention provides a system and method providing chunked, or segmented, very large file (VLF) proxy transfers. FIG. 1 illustrates an exemplary system 10 operating to provide chunked proxy transfers according to the present invention. As illustrated, the system 10 is a peer-to-peer (P2P) system including peer nodes 12A and 12B, a central node 14, guest node 16, users 18A and 18B, user 20 associated with the guest node 16, and network 22. Preferably, the network 22 is the Internet. There may be any number of peer nodes 12A, 12B and guest nodes 16.

In general, the peer nodes 12A and 12B are personal computers, mobile terminals, Personal Digital Assistants, or the like having access to the network 22. As illustrated, the peer node 12A includes peer software 24 and one or more chunked Very Large Files (VLFs) 26. It should be noted that the discussion herein of the peer node 12A is equally applicable to the peer node 12B. The central node 14 includes a proxy 28 and proxy cache 30. Note that the proxy cache 30 is shown as being separate from the proxy 28 for illustrative purposes and may be included within memory of the proxy 28. The guest node 16 is also a personal computer, mobile terminal, Personal Digital Assistant, or the like having access to the network 22 and preferably includes a web browser 32.

Figure 2:
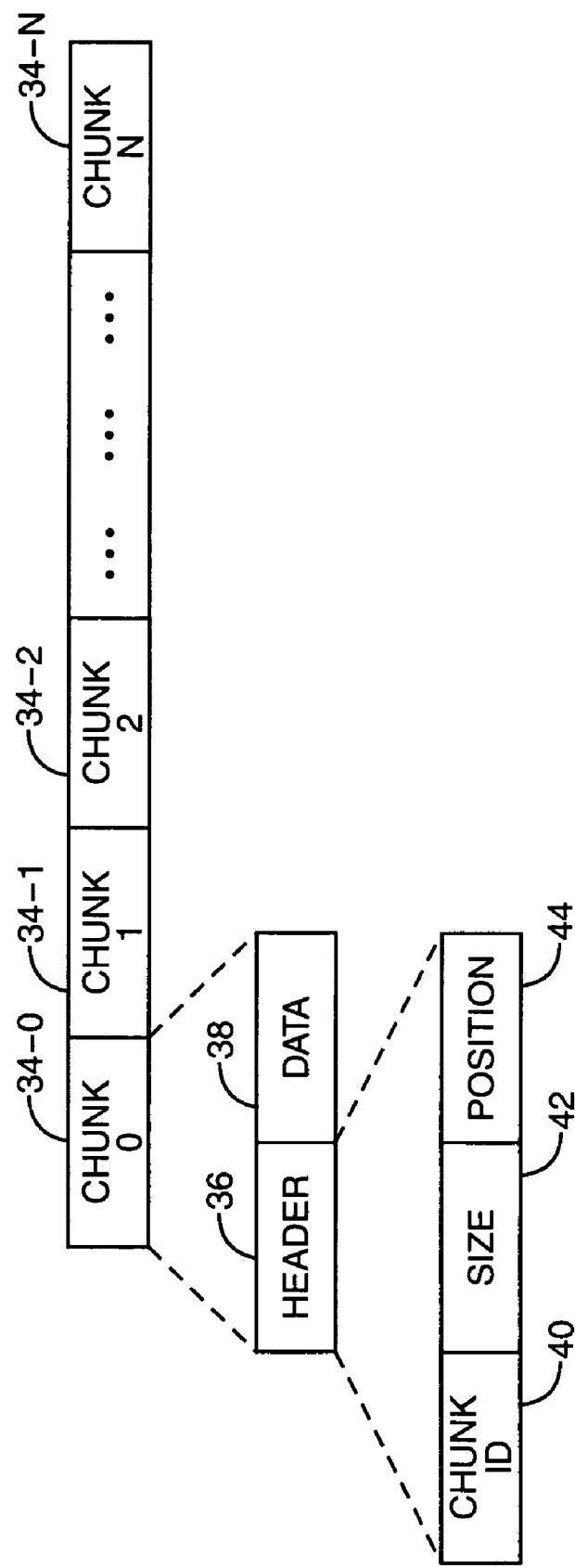
FIG. 2 illustrates a chunked Very Large File (VLF) according to one embodiment of the present invention.

As discussed below in more detail, the peer software 24 enables the peer node 12A to import a VLF (not shown) and create the chunked VLF 26 by dividing the VLF into one or more chunks, or segments, as illustrated in FIG. 2. In operation, the peer software 24 compares the size of a file to be imported to a predetermined threshold. The predetermined threshold may be static or vary dynamically. For example, the predetermined threshold may be any size such as, but not limited to, 1 Megabyte (MB), 2 MB, 5 MB, or 10 MB.

In another embodiment, the peer software 24 may generate or select the predetermined threshold based on a speed of the connection between the peer node 12A and the central node 14 over the network 22 and/or the speed of the connection between the central node 14 and the guest node 16 or another peer node.

If the size of the file is greater than the predetermined threshold, then the file is a VLF, and the peer software 24 operates to divide the VLF into a number of chunks or segments 34-0 through 34-N, which are generally referred to as chunks 34. The chunks 34 may each be of equal size or have different sizes as needed or desired. Further, each of the chunks 34 may include a header 36 and data 38. The data 38 is a portion of the VLF. The peer software 24 inserts the header 36, which may include information such as a chunk ID 40, size information 42, and a position indicator 44. The chunk ID 40 may be used to provide an indication to the proxy 28 that the chunk 34 is part of the chunked VLF 26. The size information 42 provides the size of the chunk 34, or optionally and more specifically the data 38. The position indicator 44 provides the position of the chunk 34 within the chunked VLF 26. For example, the position indicator 44 may indicate that the chunk 34-0 is the first of N+1 chunks, or chunk 0 of N chunks, in the chunked VLF 26.

Figure 3:
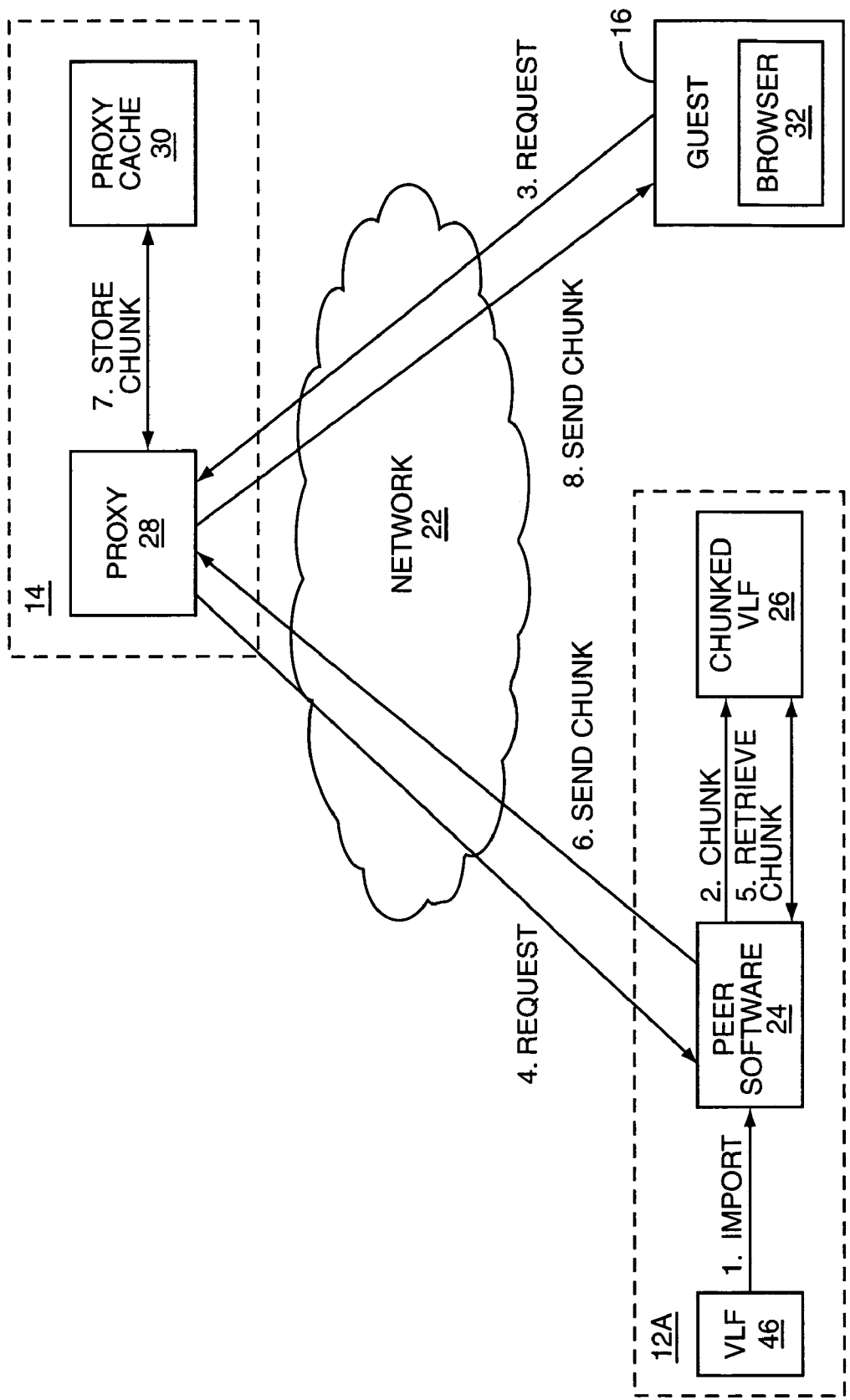
FIG. 3 is a basic block diagram illustrating a transfer of a chunked VLF from a content provider to a requesting node via a proxy when none of the chunks of the chunked VLF are stored in cache associated with the proxy according to one embodiment of the present invention.

FIG. 3 is a block diagram similar to FIG. 1 illustrating the basic operation of the system 10 during a first transfer of the chunked VLF 26. This discussion equally applies to any transfer where none of the chunks 34 of the chunked VLF 26 are stored in the proxy cache 30. First, the user 18 (FIG. 1) may instruct the peer software 24 to import a VLF 46. As discussed above, to import the VLF 46, the peer software 24 compares the size of the VLF to the predetermined threshold. If the size of the VLF 46 is greater than the predetermined threshold, the VLF 46 is indeed a VLF, and the peer software 24 operates to divide the VLF 46 into a number of chunks 34 (FIG. 2), thereby generating the chunked VLF 26.

At some point in time after generating the chunked VLF 26, the guest node 16, or alternatively another peer node, sends a request for the chunked VLF 26 to the proxy 28 via the network 22. Preferably, the request is sent from the web browser 32 on the guest node 16. The guest node 16 may generally be referred to as a requesting node. Since none of the chunks 34 of the chunked VLF 26 are stored in the proxy cache 30 at this time, the proxy 28 directs the request for the chunked VLF 26 to the peer node 12A, which may be generally referred to as a content provider. The peer software 24 receives the request, retrieves the first chunk 34-0 (FIG. 2) of the chunked VLF 26, and sends the first chunk 34-0 to the proxy 28 via the network 22.

The proxy 28 receives the first chunk 34-0 from the peer node 12A and stores the first chunk 34-0 in the proxy cache 30. Thereafter, the proxy 28 sends the first chunk 34-0 to the guest node 16. In one embodiment, sending the first chunk 34-0 and subsequent chunks 34 may include "unchunking" the chunk 34. More specifically, the proxy 28 may remove the header 36 (FIG. 2) and send the data 38 (FIG. 2) rather than sending the entire chunk 34 such that the chunking of the VLF 46 is transparent to the guest node 16.

The peer software 24 successively sends the chunks 34-1, 34-2, . . . 34-N of the chunked VLF 26 to the proxy 28. The proxy 28 receives the chunks 34-1, 34-2, . . . 34-N from the peer node 12A, stores the chunks 34-1, 34-1, . . . 34-N in the proxy cache 30, and sends the chunks 34-1, 34-2, . . . 34-N to the guest node 16 until the chunked VLF 26 is transferred to the guest node 16 or the transfer is interrupted.

If the transfer is not interrupted, all of the chunks 34 of the chunked VLF 26 are transferred to the guest node 16. During the transfer, all of the chunks 34 of the chunked VLF 26 are stored in the proxy cache 30. In one embodiment, after the transfer is complete, all of the chunks 34 of the chunked VLF 26 remain stored in the proxy cache 30 such that subsequent requests for the chunked VLF 26 can be served by the proxy 28 from the proxy cache 30. In another embodiment, after the transfer is complete, the proxy 28 operates such that only the most frequently accessed chunks 34, which may be the first M chunks 34 of the chunked VLF 26, remain stored in the proxy cache 30, where M<N+1. When a subsequent request for the chunked VLF 26 is received by the proxy 28, the proxy 28 verifies that the chunks 34 stored in the proxy cache 30 are valid. If so, the proxy 28 begins to serve the chunks 34 stored in the proxy cache 30 and requests only the chunks 34 that are not stored in the proxy cache 30 from the peer node 12A.

If the transfer is interrupted before the transfer is complete, the chunks 34 of the chunked VLF 34 that have been transferred up until that point remain stored in the proxy cache 30 after the interruption. The transfer may be interrupted due to termination of the transfer by the guest node 16 or an interruption in the connection between the peer node 12A and the proxy 28 and/or the connection between the proxy 28 and the guest node 16. If it is desirable to retain only the first M chunks 34 in the proxy cache 30 and more than M chunks 34 have been transferred at the time of the interruption, only the first M chunks 34 may remain stored in the proxy cache 30 after the interruption. Accordingly, even if the transfer is interrupted before it is complete, the chunks 34 that have been transferred up until that point, or at least the first M chunks 34, remain stored in the proxy cache 30. When a subsequent request for the chunked VLF 26 is received by the proxy 28, the proxy 28 verifies that the chunks 34 of the chunked VLF 26 stored in the proxy cache 30 are valid. If so, the proxy 28 begins to serve the chunks 34 stored in the proxy cache 30 while requesting only the chunks 34 that are not stored in the proxy cache 30 from the peer node 12A. This provides a distinct advantage over typical proxies which clear the cache if the transfer is interrupted before it is complete.

Figure 4:
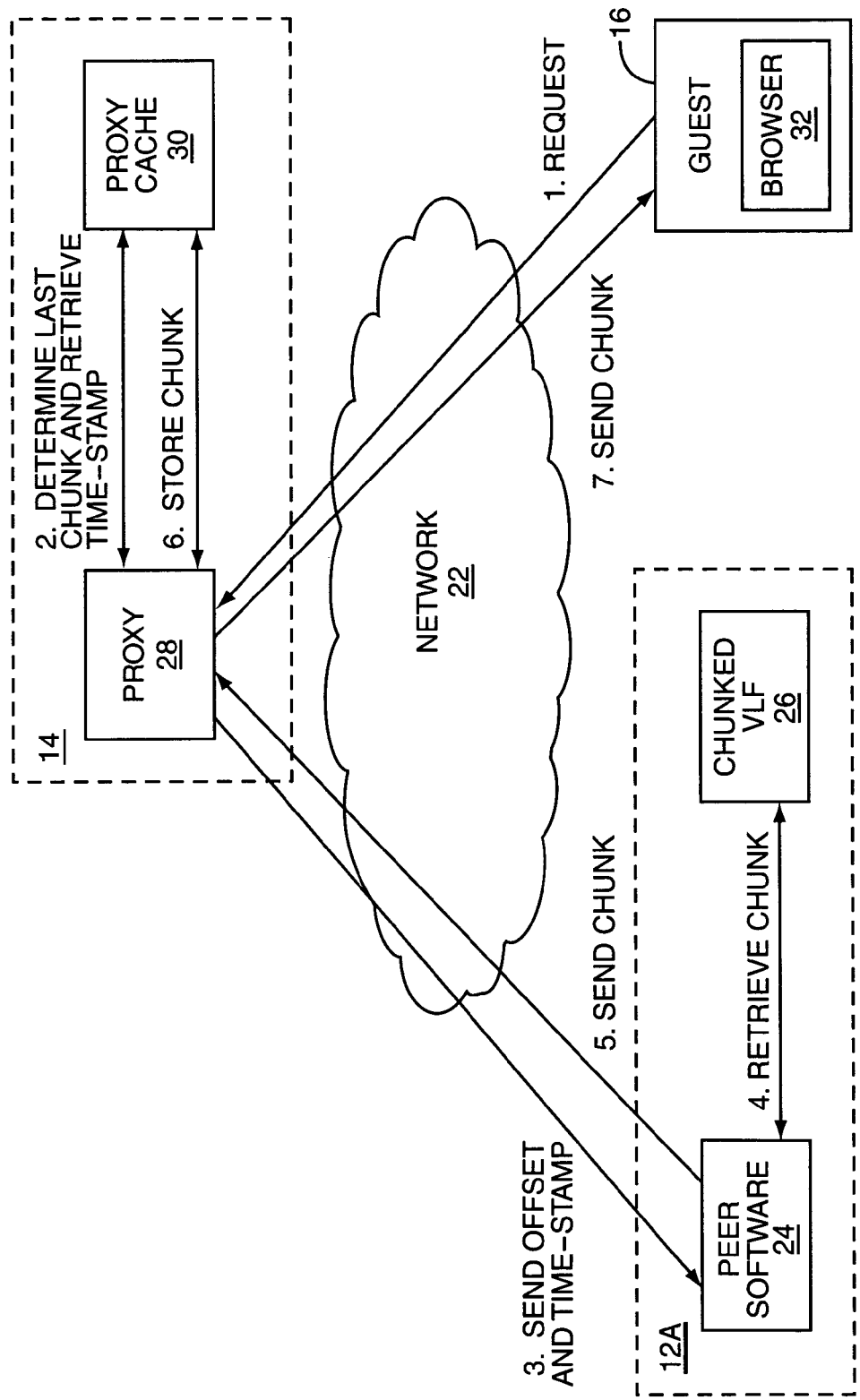
FIG. 4 is a basic block diagram illustrating a transfer of a chunked VLF to a requesting node when all or a portion of the chunks of the chunked VLF are stored in cache associated with the proxy according to one embodiment of the present invention.

FIG. 4 is a block diagram similar to FIG. 3 illustrating the operation of the system 10 during a subsequent transfer of the chunked VLF 26. The process begins when a request for the chunked VLF 26 is received at the proxy 28 from the guest node 16, or alternatively a peer node. Preferably, the request is from the web browser 32 at the guest node 16 or a web browser at a peer node. The guest node 16 of FIG. 4 may or may not be the same guest node 16 that sent the request in FIG. 3.

The proxy 28 receives the request for the chunked VLF 26 and determines whether any of the chunks 34 of the chunked VLF 26 are stored in the proxy cache 30. If so, the proxy 28 retrieves the position information 44 (FIG. 2), and optionally the chunk ID 42 (FIG. 2) identifying the chunked VLF 26, from the last chunk 34 stored in the proxy cache 30 and a time-stamp indicating the time at which the chunked VLF 26 was last modified. The position indicator 44 from header 36 of the last chunk 34 stored in the proxy cache 34 may be used to determine an offset of the last chunk 34 stored in the proxy cache 30 from the first chunk 34-0 (FIG. 2). Note that, in one embodiment, the offset is simply the position of the last chunk 34 stored in the proxy cache 30 within the chunked VLF 26.

The proxy 28 then requests the remaining chunks 34 of the chunked VLF 26 by sending the time-stamp and the offset to the peer node 12A. Thus, since the proxy 28 is aware of the chunking of the chunked VLF 26 at the peer node 12A, the proxy 28 is able to request only the needed chunks 34. This is a distinct advantage over typical caching proxies which have to request an entire file if any portion of the cached file is needed.

Once the peer node 12A receives the time-stamp and offset from the proxy 28, the peer software 24 compares the time-stamp to a current time-stamp for the chunked VLF 26. If the two time-stamps do not match, the chunks 34 stored in the proxy cache 30 are not valid, or are out-of-date, and the peer software 24 sends the first chunk 34-0 (FIG. 2) and the current time-stamp to the proxy 28. In response to receiving the first chunk 34-0, the proxy 28 clears the chunks 34 of the chunked VLF 26 from the proxy cache 30, and then stores the first chunk 34-0 in the proxy cache 30. From this point, the process continues as described above with respect to FIG. 3 such that the chunks 34 of the chunked VLF 26 are successively sent to the proxy 28 from the peer node 12A, stored in the proxy cache 30, and sent to the guest node 16 from the proxy 28 until the transfer is complete or interrupted.

If the two time-stamps do match, the chunks 34 stored in the proxy cache 30 are valid, and the peer software 24 uses the offset to determine the next chunk 34 to send to the proxy 28. For example, if the offset indicates that the last chunk 34 stored by the proxy cache 30 is the chunk 34-10, then the peer software 24 determines that the next chunk 34 to be sent to the proxy 28 is the chunk 34-11. If the offset indicates that the last chunk 34 stored in the proxy cache 30 is the last chunk 34-N, then the peer software 24 sends only the current time-stamp, thereby indicating that the chunks 34 stored in the proxy cache 30 are not out-of-date and that all of the chunks 34 are stored in the proxy cache 30.

If the last chunk 34 stored in the proxy cache 34 is not the last chunk 34-N, the peer software 24 retrieves the next chunk 34 from the chunked VLF 26 and sends the next chunk 34, and optionally the current time-stamp, to the proxy 28. Upon receiving the chunk 34 from the peer node 12A, the proxy 28 stores the chunk 34 in the proxy cache 30 as the next chunk 34 in the chunked VLF 26.

At this point, the proxy 28 begins to send the chunks 34 stored in the proxy cache 30 to the guest node 16 in a First-In-First-Out (FIFO) fashion. At the same time, the proxy 28 continues to receive the chunks 34 from the peer node 12A and store the received chunks 34 in the proxy cache 30. The process continues until all of the chunks 34 of the chunked VLF 26 are transferred to the guest node 16 or until an interruption in the transfer occurs. As discussed above, when sending the chunks 34 to the guest node 16, the proxy 28 may remove the header 36 (FIG. 2) and send the data 38 (FIG. 2), rather than the entire chunk 34, to the guest node 16 such that the chunking of the VLF is transparent to the guest node 16.

Figure 5:
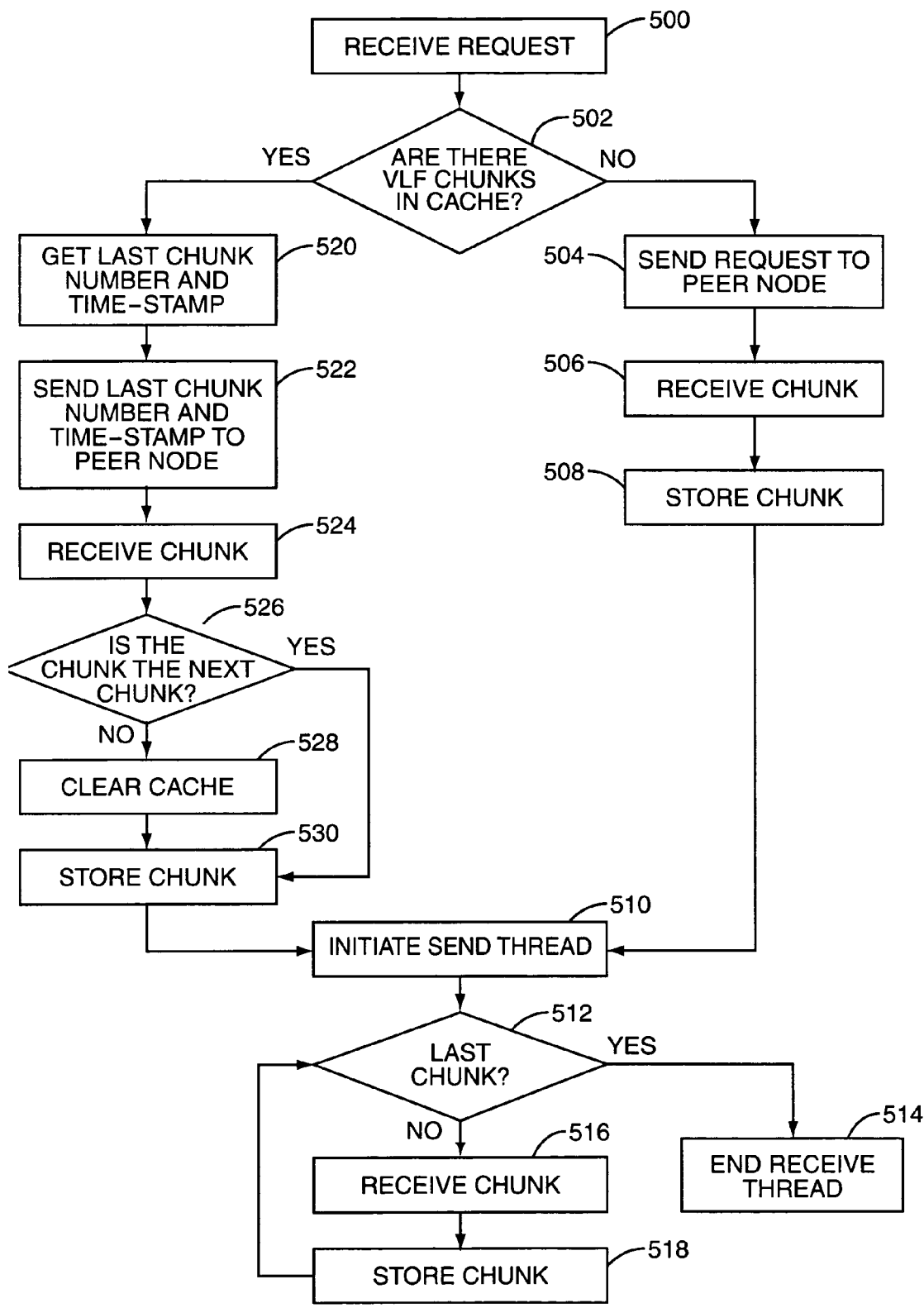
FIG. 5 is a flow chart illustrating the operation of the proxy according to one embodiment of the present invention.

FIG. 5 illustrates the operation of the proxy 28. As discussed above, the transfer begins when the proxy 28 receives a request for the chunked VLF 26 from the guest node 16 or alternatively a peer node (step 500). Upon receiving the request, the proxy determines whether there are chunks 34 of the chunked VLF 26 stored in the proxy cache 30 (step 502). If there are no chunks 34 stored for the chunked VLF 26, the proxy 28 sends a request to the peer node 12A for the chunked VLF 26 (step 504). The proxy 28 then receives the first chunk 34-0 (FIG. 2) from the peer node 12A (step 506) and stores the first chunk 34-0 in the proxy cache 30 (step 508).

At this point, the proxy 28 initiates a send thread (step 510). The send thread operates to send the chunks 34 of the chunked VLF 26 stored in the proxy cache 30 in a FIFO fashion while at the same time the proxy 28 receives chunks 34 from the peer node 12A. After initiating the send thread, the proxy 28 determines whether the chunk 34, which for the first iteration is the first chunk 34-0, is the last chunk 34-N (FIG. 2) of the chunked VLF 26 (step 512). If the chunk 34 is the last chunk 34-N, then the receive thread is ended (step 514). If the chunk 34 is not the last chunk 34, the proxy 28 iteratively receives the next chunk 34 from the peer node 12A (step 516) and stores the next chunk 34 in the proxy cache 30 (step 518) until the last chunk 34-N is received. As discussed above, the process may also be terminated due to interruption of the transfer.

Returning to step 502, if the proxy 28 receives the request from the guest node 16 and chunks 34 of the chunked VLF 26 are stored in the proxy cache 30, then the proxy 28 retrieves the position indicator 44 (FIG. 2) and optionally the chunk ID 40 (FIG. 2) identifying the chunked VLF 26 of the last chunk 34 stored in the proxy cache 30 and the time-stamp indicating the time at which the chunked VLF 26 was last modified (step 520). The position indicator 44 from the last chunk 34 stored in the proxy cache 30 may be used to determine the offset of the last chunk 34 stored in the proxy cache 30 from the first chunk 34-0 (FIG. 2). The proxy 28 then sends the time-stamp and the offset to the peer node 12A (step 522).

As discussed above, the peer software 24 compares the time-stamp from the proxy 28 to the current time-stamp of the chunked VLF 26. If the time-stamps do not match, the peer software 24 returns the first chunk 34-0 (FIG. 2) and the current time-stamp, thereby indicating that the chunks 34 of the chunked VLF 26 stored in the proxy cache 30 are out-of-date. If the time-stamps do match, the peer software 24 uses the offset to retrieve the next chunk 34 to be sent to the proxy 28 and sends the next chunk 34, and optionally the current time-stamp, to the proxy 28.

The proxy 28 then receives the chunk 34 from the peer node 12A (step 524) and determines whether the chunk 34 from the peer node 12A is the next chunk 34, which is the chunk 34 following the last chunk 34 stored in the proxy cache 30 (step 526). If the chunk 34 from the peer node 12A is not the next chunk 34, the chunks 34 stored in the proxy cache 30 are out-of-date, and the proxy 28 clears the chunks 34 from the proxy cache 30 (step 528). Thereafter, the chunk 34 received from the peer node 12A, which is the first chunk 34-0, is stored in the proxy cache 30 (step 530).

Returning to step 526, if the chunk 34 received from the peer node 12A is the next chunk 34, the proxy 28 does not clear the proxy cache 30. Instead, the proxy 28 proceeds to step 530 to store the next chunk 34. At this point, the proxy 28 initiates the send thread (step 510) and proceeds to receive and store the remaining chunks 34 of the chunked VLF 26, as described above.

Figure 6:
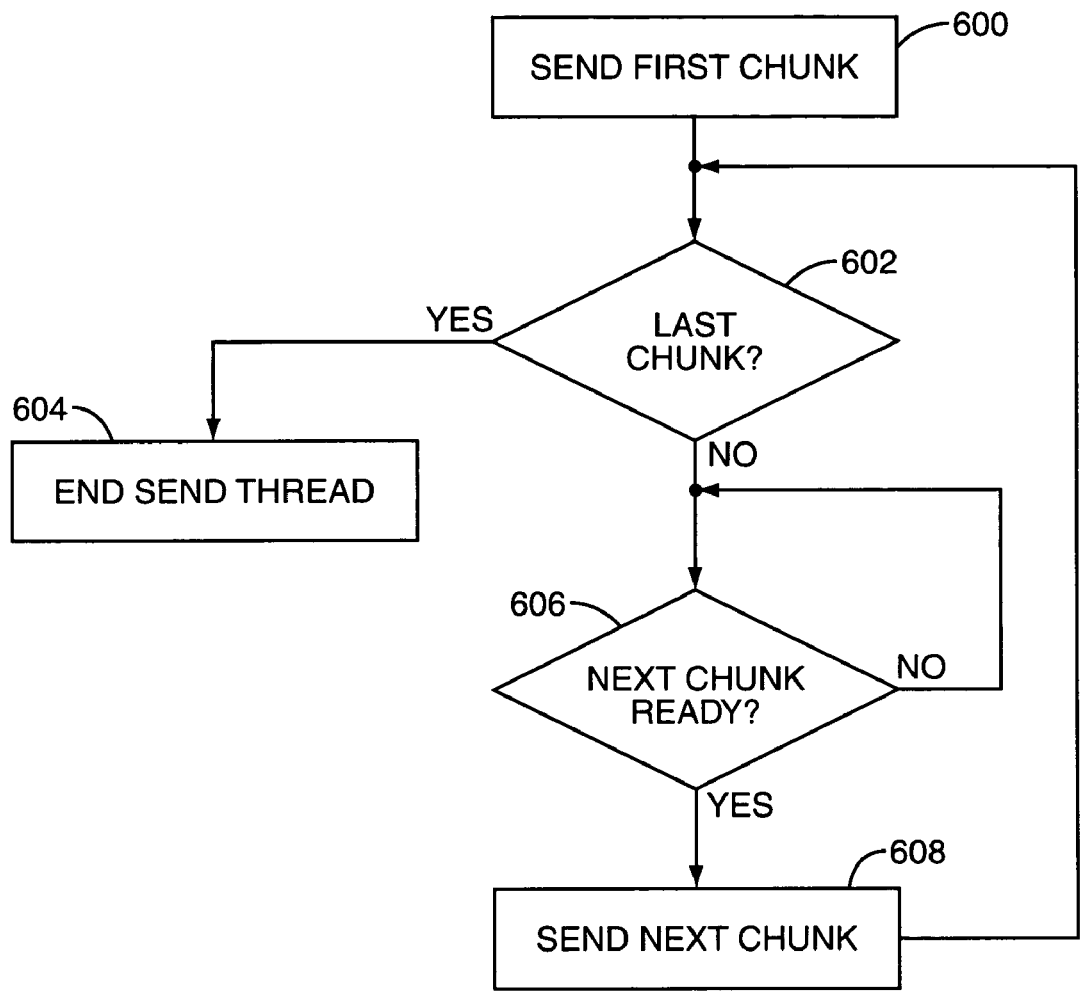
FIG. 6 illustrates a send thread performed by the proxy to send chunks of a chunked VLF to a requesting node according to one embodiment of the present invention.

FIG. 6 illustrates an exemplary embodiment of the send thread of the proxy 28. In the preferred embodiment, the proxy 28 operates to perform the send thread and steps 512-514 of FIG. 5, which are referred to as a receive thread, simultaneously. In general, the send thread operates to send the chunks 34 of the chunked VLF 26 stored in the proxy cache 30 to the guest node 16 in a FIFO fashion. More specifically, when the send thread is initiated, the proxy 28 sends the first chunk 34-0 (FIG. 2) from the proxy cache 30 to the guest node 16 (step 600). The proxy 28 then determines whether the chunk 34 just sent was the last chunk 34-N (FIG. 2) of the chunked VLF 26 (step 602). If so, the proxy 28 ends the send thread (step 604). If not, the proxy 28 then determines whether the next chunk 34 of the chunked VLF 26 is ready to be sent (step 606). For example, if the first chunk 34-0 was just sent, the proxy 28 determines whether the second chunk 34-1 is stored in the proxy cache 30 such that it is ready to be sent. If the next chunk 34 is not ready to be sent, the proxy 28 waits for the next chunk 34 to be stored in the proxy cache 30. Once the next chunk 34 is ready to be sent, the proxy 28 sends the next chunk 34 from the proxy cache 30 to the guest node 16 and returns to step 602 (step 608). The process continues until the last chunk 34-N is sent to the guest node 16 or the transfer is interrupted.

It should be noted that the peer software 24 may be downloaded and installed on the peer node 12A from any type of computer readable media such as, but not limited to, a storage device of the central node 14, a storage device another peer node or the guest node 16, an optical disk such as a compact disc (CD) or a Digital Video Disc (DVD), or the like. In addition, the peer software 24 may reside on the central node 14 and be downloaded to and installed on the peer node 12A.

Figure 7:
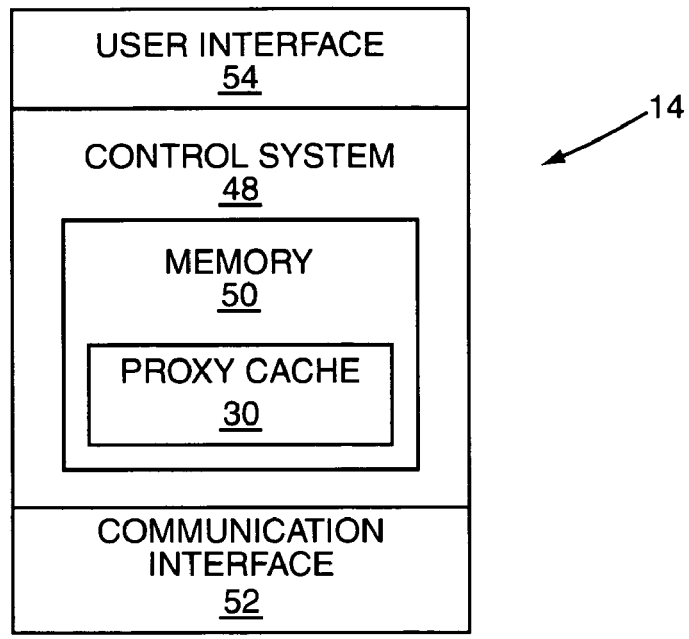
FIG. 7 is a basic block diagram of an exemplary embodiment of the proxy of FIG. 1.

FIG. 7 illustrates a basic block diagram of an exemplary embodiment of the proxy 28. The proxy 28 may generally include a control system 48 having associated memory 50. The memory 50 may store software (not shown) controlling the operation of the proxy 28 and the proxy cache 30. Note that the proxy cache 30 is illustrated as being part of the memory 50 of the proxy 28. However, the proxy cache 30 may be memory separate from the memory 50 of the proxy 28. The proxy 28 may also include a communication interface 52 for communicating with other network entities via the network 22. The communication interface 52 may include an interface to various external devices. A user interface 54 may also be provided and include a keypad and a mouse (not shown).

Figure 8:
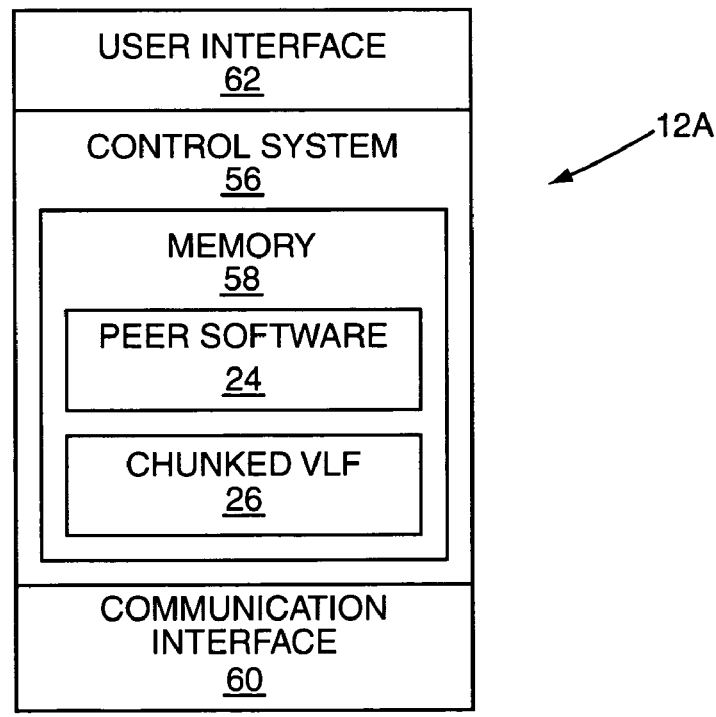
FIG. 8 is a basic block diagram of an exemplary embodiment of the peer node of FIG. 1.

FIG. 8 illustrates a basic block diagram of an exemplary embodiment of the peer node 12A. The peer node 12A may generally include a control system 56 having associated memory 58. The memory 58 may store the peer software 24 and the chunked VLF 26. The peer node 12A may also include a communication interface 60 for communicating with other network entities via the network 22. The communication interface 60 may include an interface to various external devices such as a printer. A user interface 62 may also be provided and include a keypad and a mouse (not shown).

The present invention provides substantial opportunity for variation without departing from the spirit or scope of the present invention. For example, although the present invention has been described with respect to the P2P system 10, the present invention may be used in any type of proxy transfer system. For example, the operation of the peer node 12A may be implemented on any type of content provider where a file to be transferred is chunked by the content provider rather than at the proxy 28. As another example, although the proxy 28 and proxy cache 30 are illustrated as being included in the central node 14, the proxy 28 and proxy cache 30 may each be implemented in a distributed fashion such that there are multiple proxies 28 and proxy caches 30 distributed across the system 10. In this case, the cached chunks 34 may be stored in a single proxy cache 30 or stored partially or completely in multiple proxy caches 30.

Those skilled in the art will recognize improvements and modifications to the preferred embodiments of the present invention. All such improvements and modifications are considered within the scope of the concepts disclosed herein and the claims that follow.

What is claimed is:

1. A proxy for transferring a Very Large File (VLF) from a content provider to a requesting node via a network comprising:
   a) a communication interface coupled to the network;
   b) memory forming proxy cache; and
   c) a control system facilitating a transfer of the VLF to the requesting node and adapted to:
      i) receive a request for the VLF from the requesting node via the communication interface, wherein the VLF has been processed by the content provider to provide a chunked VLF comprising a plurality of chunks; and
      ii) when there is at least one chunk of the plurality of chunks stored in the proxy cache:
         A) request additional chunks of the plurality of chunks other than the at least one chunk of the plurality of chunks stored in the proxy cache from the content provider via the communication interface, wherein in order to request the additional chunks from the content provider, the control system is further adapted to:
            obtain an offset of a last one of the at least one chunk of the plurality of chunks stored in the proxy cache;
            obtain a time-stamp indicating a time at which the chunked VLF was last modified from the proxy cache; and
            send the offset and the time-stamp to the content provider as a request for the additional chunks;
         B) receive the additional chunks from the content provider via the communication interface, wherein if there is an interruption during the transfer before each of the additional chunks is received by the proxy, the control system is further adapted to store in the proxy cache at least a portion of the additional chunks received prior to the interruption of the transfer and the at least one chunk in order to serve subsequent requests for the VLF; and
         C) provide the at least one chunk and the additional chunks to the requesting node via the communication interface.

2. The proxy of claim 1 wherein if none of the plurality of chunks of the chunked VLF are stored in the proxy cache, the control system is further adapted to:
   request the VLF from the content provider;
   receive at least one chunk of the plurality of chunks from the content provider via the communication interface;
   store the at least one chunk of the plurality of chunks from the content provider in the proxy cache; and provide the at least one chunk of the plurality of chunks from the content provider to the requesting node via the communication interface.

3. The proxy of claim 1 wherein in response to the request from the proxy, the content provider is further adapted to:
   compare the time-stamp with a current time-stamp of the chunked VLF;
   provide the additional chunks to the proxy if the time-stamp matches the current time-stamp; and
   provide the plurality of chunks starting with a first of the plurality of chunks and the current time-stamp to the proxy if the time-stamp does not match the current time-stamp.

4. The proxy of claim 3 wherein when the content provider provides the plurality of chunks starting with the first of the plurality of chunks rather than the additional chunks, the control system is further adapted to:
   clear the proxy cache;
   receive each of the plurality of chunks from the content provider;
   store each of the plurality of chunks from the content provider in the proxy cache; and
   provide each of the plurality of chunks to the requesting node.

5. The proxy of claim 1 wherein each of the plurality of chunks comprises a header and data, wherein the data corresponds to a portion of the VLF.

6. The proxy of claim 5 wherein for each of the plurality of chunks, the header comprises an identifier that identifies the chunk, size information indicating a size of the chunk, and position information indicating a position of the chunk within the chunked VLF.

7. The proxy of claim 5 wherein to provide each of the at least one chunk of the plurality of chunks and the additional chunks to the requesting node, the control system is further adapted to provide the data, rather than the header and the data, to the requesting node.

8. The proxy of claim 1 wherein the control system receives the additional chunks from the content provider and provides the at least one chunk of the plurality of chunks and the additional chunks to the requesting node simultaneously.

9. The proxy of claim 1 wherein the content provider is a peer node in a peer-to-peer (P2P) network.

10. A non-transitory computer readable media comprising software for instructing a computer operating as a content provider to:
    process a Very Large File (VLF) to generate a chunked VLF comprising a plurality of chunks;
    receive a request for additional chunks from a proxy storing at least one chunk of the plurality of chunks in a proxy cache, wherein the proxy facilitates a transfer of the chunked VLF from the computer to a requesting node and the request includes an offset of a last one of the at least one chunk of the plurality of chunks stored in the proxy cache and a time-stamp indicating a time at which the chunked VLF was last modified from the proxy cache; and
    when the request from the proxy is for a remainder of the plurality of chunks not stored by the proxy, provide the remainder of the plurality of chunks to the proxy, the proxy storing the remainder of the plurality of chunks in the proxy cache and providing the plurality of chunks to the requesting node, wherein if there is an interruption during the transfer before each of the plurality of chunks is received by the proxy, the proxy stores at least a portion of the plurality of chunks received prior to the interruption of the transfer.

11. The computer readable media of claim 10 wherein the software is further adapted to instruct the computer to:
    when at least one chunk of the plurality of chunks is stored in the proxy cache and the request is for additional chunks of the plurality of chunks other than the at least one chunk, provide the additional chunks to the proxy, wherein the proxy provides the at least one chunk of the plurality of chunks and the additional chunks to the requesting node.

12. The computer readable media of claim 11 wherein the proxy stores the additional chunks in addition to the at least one chunk of the plurality of chunks.

13. The computer readable media of claim 10 wherein, the software is further adapted to instruct the computer to:
    compare the time-stamp with a current time-stamp of the chunked VLF;
    provide the additional chunks to the proxy if the time-stamp matches the current time-stamp; and
    provide the plurality of chunks starting with a first of the plurality of chunks and the current time-stamp to the proxy if the time-stamp does not match the current time-stamp.

14. The computer readable media of claim 10 wherein in order to process the VLF to generate the chunked VLF, the software is further adapted to instruct the computer to:
    compare a size of the VLF to a predetermined threshold; and
    if the size is greater than the predetermined threshold, segment the VLF into the plurality of chunks, thereby generating the chunked VLF.

15. The computer readable media of claim 14 wherein each of the plurality of chunks comprises a header and data, wherein the data corresponds to a portion of the VLF.

16. The computer readable media of claim 15 wherein for each of the plurality of chunks, the header comprises an identifier that identifies the chunk, size information indicating a size of the chunk, and position information indicating a position of the chunk within the chunked VLF.

* * * * *